United States Patent [19]

Sato

[11] Patent Number: 4,989,111
[45] Date of Patent: Jan. 29, 1991

[54] TAPE CASSETTE UTILIZING FIBER OPTIC BUNDLE

[75] Inventor: Masanori Sato, Miyagi, Japan

[73] Assignee: Sony Corporation, Tokyo, Japan

[21] Appl. No.: 393,679

[22] Filed: Aug. 14, 1989

[30] Foreign Application Priority Data

Sep. 13, 1988 [JP] Japan .................................. 63-229477

[51] Int. Cl.$^5$ ............................................. G11B 23/02
[52] U.S. Cl. ..................................... 360/132; 242/199
[58] Field of Search ................. 360/132; 242/198–200

[56] References Cited

U.S. PATENT DOCUMENTS 4,380,032  4/1983  Pfost ................................ 360/132 X Primary Examiner—A. J. Heinz
Attorney, Agent, or Firm—Philip M. Shaw, Jr.

[57] ABSTRACT

A tape cassette of the type in which a tape having a transparent predetermined portion is housed between an upper cassette half and a lower cassette half in such a manner that the tape intersects a light path connecting a light emitting element insertion portion and a light receiving window formed through a side wall of the tape cassette, a light emitting element is inserted into the light emitting element insertion portion and a light receiving element is located outside of the light receiving window, thereby detecting the predetermined portion of the magnetic tape, and wherein the tape cassette has a rib formed on the upper cassette half, a rib formed on the lower cassette half, and an optical fiber bundle provided along the light path and near the light receiving window, whereby even when the tape cassette is a color other than black, a photoelectric type start sensor or end sensor can be prevented from malfunctioning.

13 Claims, 8 Drawing Sheets

TAPE CASSETTE UTILIZING FIBER OPTIC BUNDLE

BACKGROUND OF THE INVENTION

1. Field of the Invention

The present invention relates generally to tape cassettes and, more particularly, is directed to a tape cassette suitable as a so-called color tape cassette of a video tape recorder (VTR).

2. Description of the Prior Art

In order to simplify the loading or unloading of a recording and reproducing magnetic tape in a video tape recorder, a tape cassette having a magnetic tape wound therein is useful. It is convenient for a user, when this tape cassette is loaded into the video tape recorder, if the video tape recorder/player can determine whether the magnetic tape within the tape cassette is in the rewound state (start mode) or whether the magnetic tape is in the wound state (end mode). For this reason, the tape cassette is generally provided with a mechanism, by which the start mode or the end mode of the magnetic tape can be detected from the outside of the cassette.

FIG. 1 shows such a prior-art tape cassette which is generally designated by reference number 1. In FIG. 1, reference numeral 2 denotes an upper cassette half, 3 a lower cassette half and a 4 magnetic tape. A transparent leader/trailer tape 4a is connected to the respective ends of the magnetic tape 4. A guard panel 5 protects the magnetic tape 4 from smudges, finger marks and so on. Transparent windows 6A, 6B are formed on the upper cassette half 2 so that the inside of the tape cassette can be visually confirmed.

FIG. 2 shows the side of the lower cassette half 3 of the prior-art tape cassette of the example shown in FIG. 1.

Referring to FIG. 2, it will be seen that the magnetic tape 4 is supplied from a supply reel 7A and is taken up by a take-up reel 7B through a guide pole 11, a tape guide 12, a front panel 3b of the lower cassette half 3, a tape guide 13 and a guide roller 14. The supply reel 7A is held between a reel flange 8A and a lower reel flange (not shown), and the take-up reel 7B is held between a reel flange 8B and a lower reel flange (not shown). Brake levers 9A and 9B are respectively engaged with lower reel flanges (not shown), and these brake levers 9A and 9B are operated by a release 10 from the outside.

Along the front panel 3b, arcuate front ribs 15 and 16 are formed to be substantially coaxial with the supply reel 7A and the take-up reel 7B, whereby a space 17 is formed between the magnetic tape 4 and the front rib 15. Also, a space 18 is formed on the front panel 3b. Loading posts (not shown) of a video tape recorder are inserted into these spaces 17 and 18 when the tape cassette is loaded into the video tape recorder. Through the cylindrical wall 19, there are provided lighting windows 19a and 19b in an opposing relation with an angular extent of substantially 180 degrees.

One end of a side wall 3a of the lower cassette half 3 near the side of the take-up reel 7B is recessed to form a partition 20 as shown in FIG. 3. The partition 20 is covered with the guard panel 5. As shown in FIG. 3, apertures 20a, 20b and a light receiving window 21 are formed through the partition 20. Two partitions 22, 23 extend from the lower cassette half 3 perpendicular to the partition 20 and aligned slits 22a, 23a are respectively formed on the partitions 22, 23. Rotating shafts 24c and 24d of a lid locking member 24 are engaged with the above-mentioned slits 22a and 23a, and the lid locking member 24 is generally spring-biased by a spring (not shown) in the direction shown by $\theta$ in FIG. 3. Accordingly, as, for example, shown in FIG. 1, a lock-releasing pin 24a and a lock lever 24b of the lid locking member 24 project to the outside through the apertures 20a and 20b of the partition 20, and the lock lever 24b is engaged with a lock slit 5a of the guard panel 5 (when the guard panel 5 is in its normally closed position). When the guard panel 5 is opened, as shown in FIG. 1, the engagement between the lock lever 24 and the lock slit 5a has to be released by inwardly pushing the lock releasing pin 24a.

A side wall 3c of the lower cassette half is parallel to the side wall 3a. Further, one end of the side wall 3c at its position near the side of the supply reel 7A is concave to provide a partition 25 covered with the guard panel 5 as shown in FIG. 4. As shown in FIG. 4, a light receiving window 26 of a slit configuration is formed in the partition 25.

In order for the video tape recorder to determine whether the magnetic tape 4 is in the start mode or in the end mode after the tape cassette 1 shown in the example of FIG. 1 is loaded into the video tape recorder, as shown in FIGS. 1 to 3, a light emitting element 27 is inserted into the cylindrical wall 19 of the lower cassette half 3 and a start sensor 28 and an end sensor 29, each formed of a light receiving element, are positioned outside the light receiving windows 21 and 26, respectively. When the transparent leader tape 4a intersects an optical axis $L_1$ connecting the lighting window 19a and the light receiving window 21, the start sensor 28 generates a signal, while when the transparent trailer tape 4a intersects an optical axis $L_2$ connecting the lighting window 19b and the light receiving window 26, the end sensor 29 generates a signal. Thus, the video tape recorder can determine whether the magnetic tape 4 is in the start mode or in the end mode.

In the prior-art tape cassette, the upper cassette half 2 and the lower cassette half 3 are both made of a black (light absorption property) resin so that the light emitted from the light emitting element 27 of the tape cassette which is inserted into the video tape recorder is hardly reflected irregularly within the housing of the tape cassette. Also, light from various light sources located outside the tape cassette cannot pass through the upper cassette half 2 into the inside of the tape cassette to be reflected on its inside wall and leaked to the outside through the light receiving windows 21, 26. Consequently, the start sensor 28 and the end sensor 29 are prevented from malfunctioning.

With the spreading use of video tape recorders, however, it is desirable that a tape cassette for a video tape recorder be formed as a so-called color tape cassette. We have made experiments wherein colors of the upper cassette half 2 and the lower cassette half 3 are changed to colors other than black, for example, gray and green. Experimental results revealed that as shown in FIG. 4, an irregularly-reflected light $L_3$ from the bottom plate 3d of the lower cassette half 3, an irregularly-reflected light $L_4$ from the reel flange 8B, an external illumination light $L_5$ passing through the upper cassette half 2 and so on enter the end sensor 29 through the light receiving window 26. There is then presented a problem that the end sensor 29 is caused to malfunction when the magnetic tape 4 is not in the end mode. The start sensor 28 suffers from a similar problem.

Japanese Laid-open Utility Model No. 62-98086 discloses a tape cassette in which while the color thereof remains black, a light-shielding wall is provided near the light receiving window 26 so as to close the spacing between the guide pole 11 and the side wall 3c of the lower cassette half 3, in order to improve the operation of the end sensor 29. The above-mentioned light-shielding wall, however, cannot be formed without difficulty because the guide pole 11 is generally made of metal. In addition, the light-shielding wall is effective only for an incident light irregularly-reflected from the direction of the guide pole 11.

SUMMARY OF THE INVENTION

It is a general object of the present invention to provide an improved tape cassette which is free of the above-mentioned defects encountered with the prior-art tape cassette.

More specifically, it is an object of the present invention to provide a tape cassette which can prevent a start sensor or an end sensor from malfunctioning even when the tape cassette has a colored upper or lower cassette half.

It is another object of the present invention to provide a tape cassette for which the assembly-process can be simplified.

According to an aspect of the present invention, there is provided a tape cassette in which a magnetic tape having a transparent predetermined portion is wound between an upper cassette half and a lower cassette half in such a manner that said magnetic tape intersects a light path connecting a light emitting element insertion portion and a light receiving window formed through a side wall of said tape cassette. A light emitting element is inserted into said light emitting element insertion portion and a light receiving element is located outside of said light receiving window thereby to detect said predetermined portion of said magnetic tape. The tape cassette comprises:

(a) a rib formed on said upper cassette half;
(b) a rib formed on said lower cassette half; and
(c) an optical fiber bundle provided along said light path and near said light receiving window.

These and other objects, features and advantages of the present invention will be apparent in the following detailed description of preferred embodiments of the invention when read in conjunction with the accompanying drawings, in which like reference numerals are used to identify the same or similar parts in the several views.

DETAILED DESCRIPTION OF PREFERRED EMBODIMENT

The present invention will hereinafter be described with reference to FIGS. 5 to 10. In FIGS. 5 to 10, like parts corresponding to those of FIGS. 1 to 4 are marked with the same references and therefore will not be described in detail.

Figure 1:
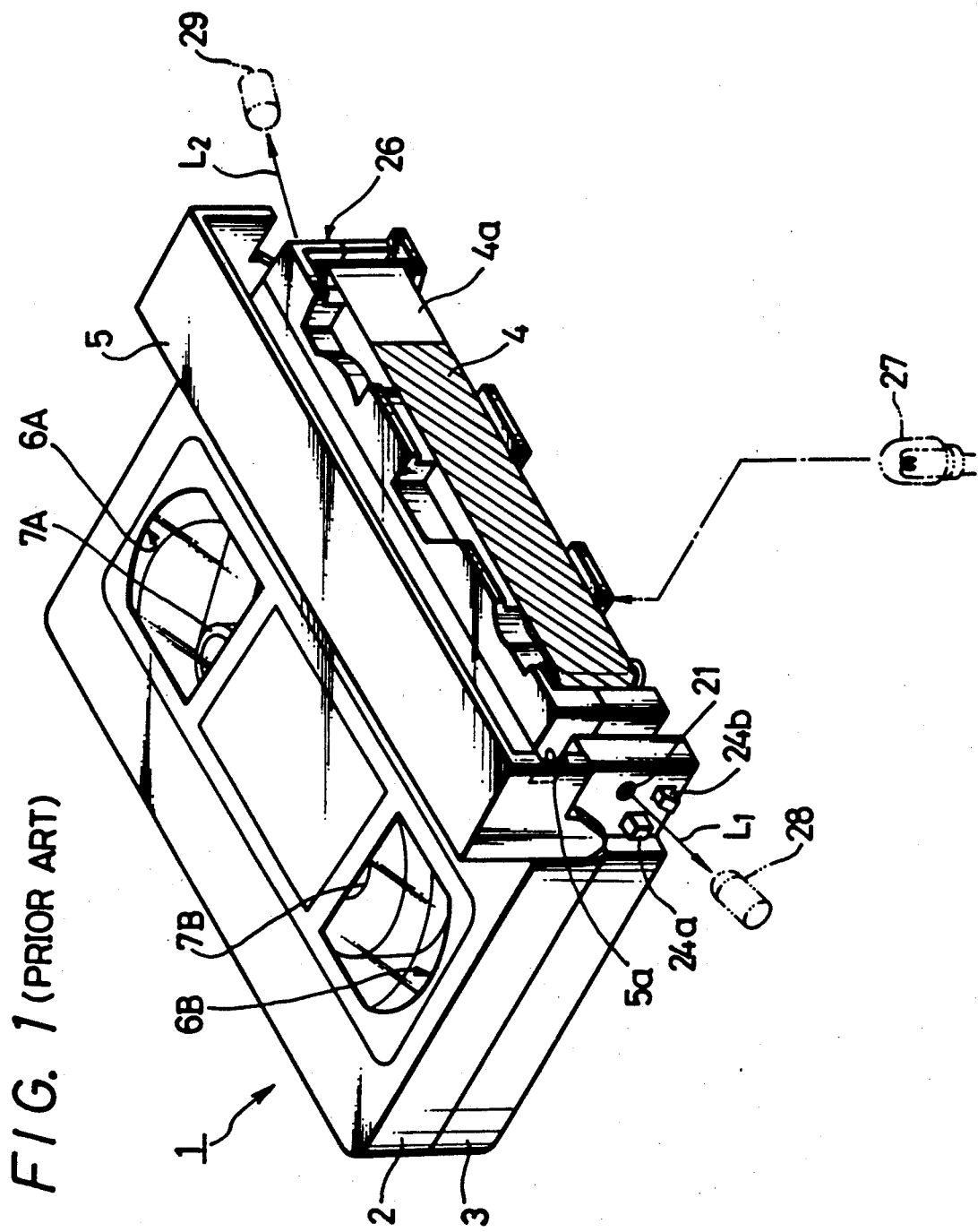
FIG. 1 is a perspective view of a prior-art tape cassette.
Figure 2:
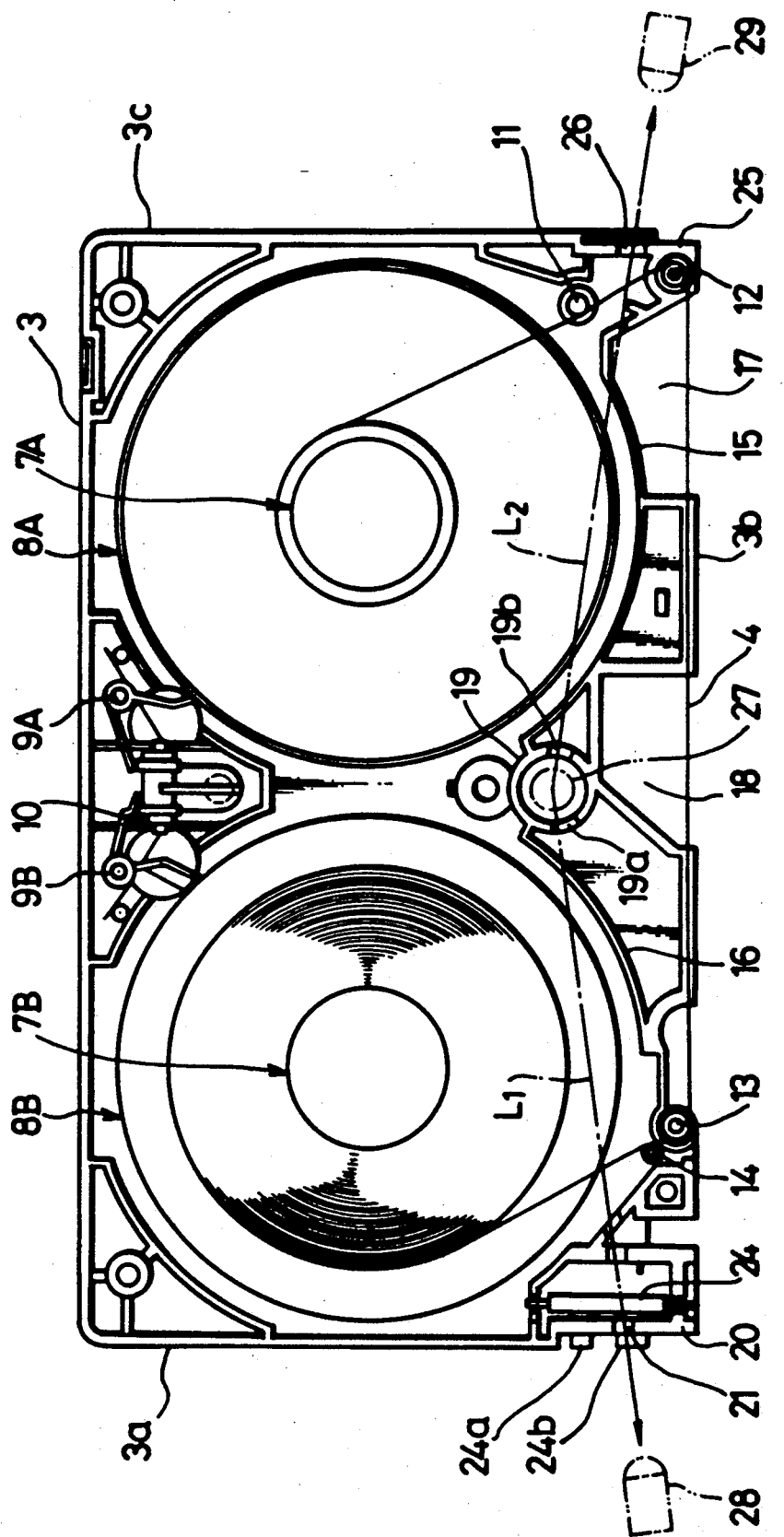
FIG. 2 is a plan view of a lower cassette half side of the prior-art tape cassette shown in FIG. 1.
Figure 3:
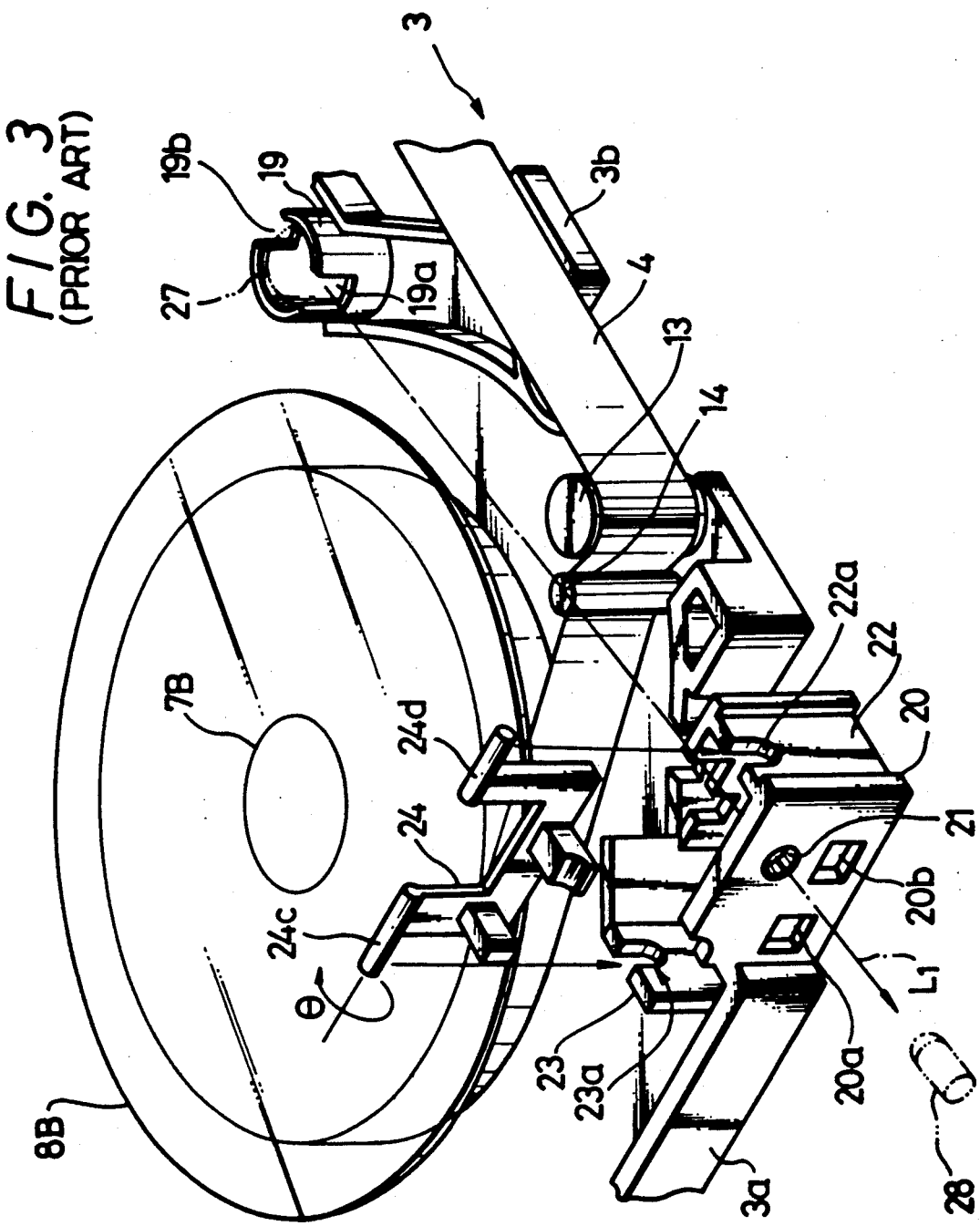
FIGS. 3 and 4 are enlarged, perspective views of a take-up reel and a supply reel of the prior-art tape cassette shown in FIG. 2.
Figure 4:
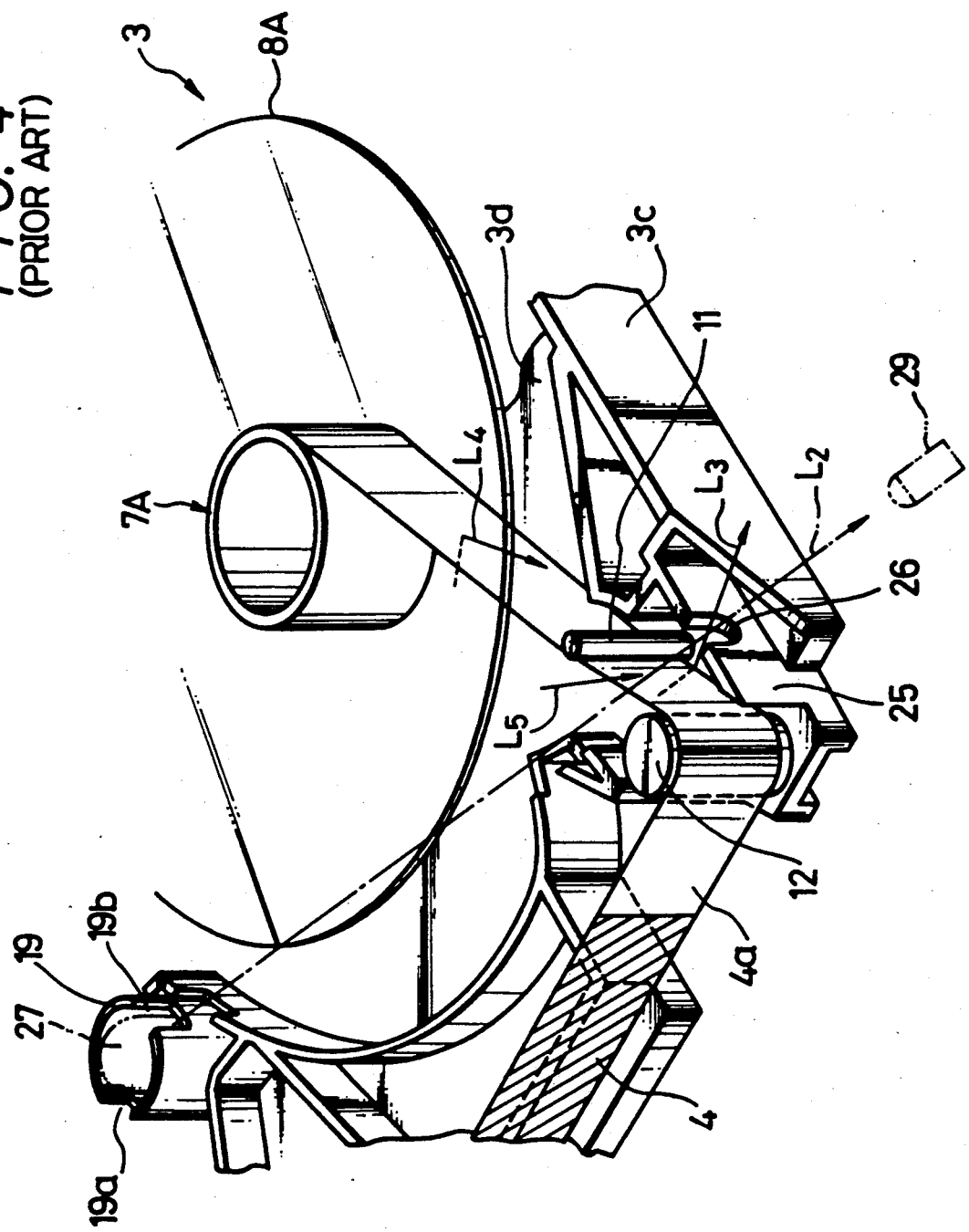
Figure 5:
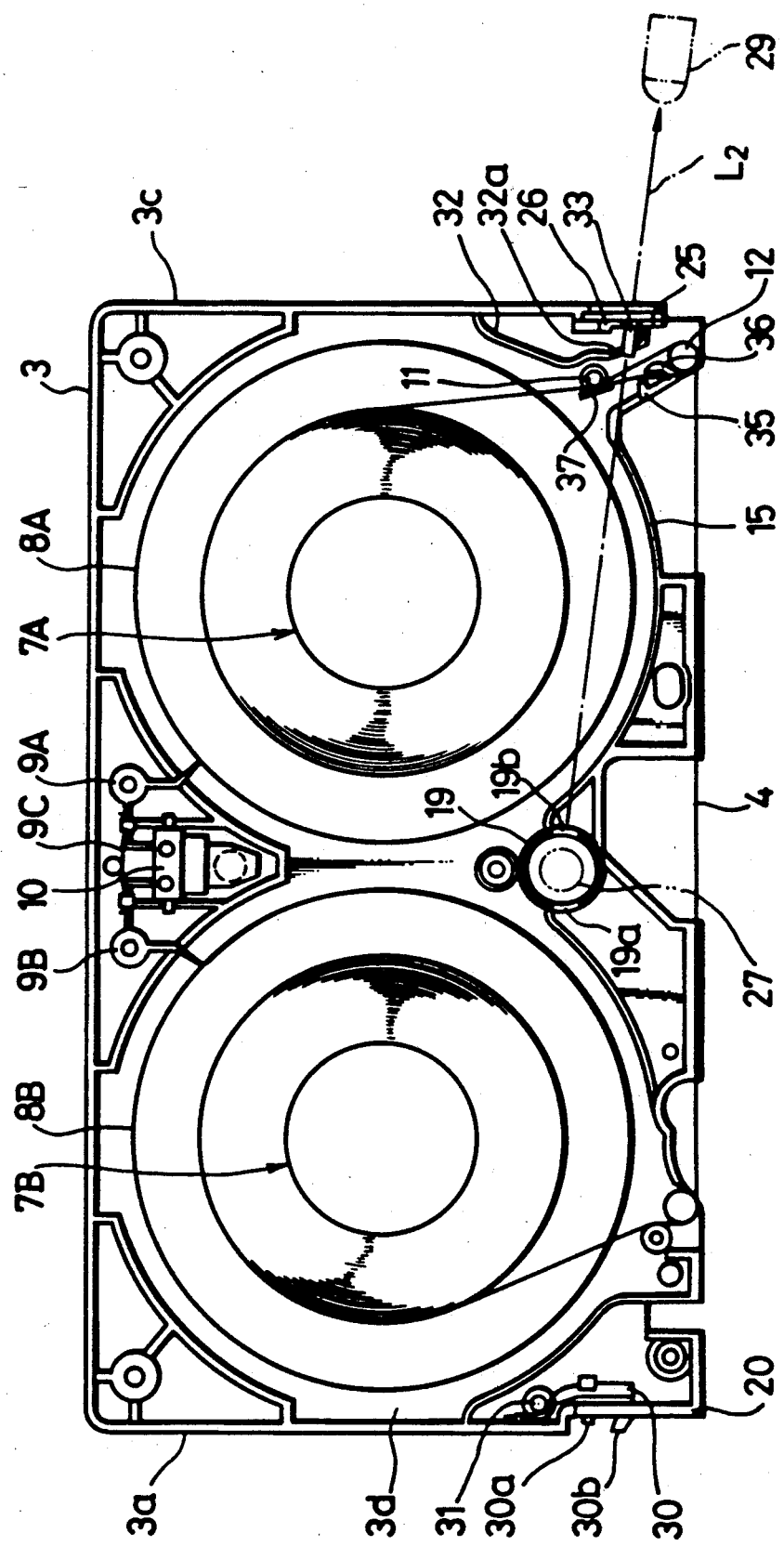
FIG. 5 is a plan view of an embodiment of a tape cassette according to the present invention, illustrating a lower cassette half side thereof.

FIG. 5 shows the lower cassette half side of an embodiment of the tape cassette according to the present invention. In FIG. 5, reference numeral 3 designates the lower cassette half which is made of material whose color is other than black, as will be described later. There is shown a spring 9C which spring-biases the brake levers 9A and 9B in the direction of the release 10. In FIG. 5, reference numeral 30 designates a lid locking member, and in this embodiment, the lid locking-member 30 is mounted that it can rotate around a shaft 31 implanted on the bottom plate 3d of the lower cassette half 3 and along the bottom plate 3d. Due to the spring force of the spring, a lock releasing pin 30a and a lock lever 30b of the lid locking member 30 are normally projected through two apertures formed on the partition 20 to its outside.

Figure 6:
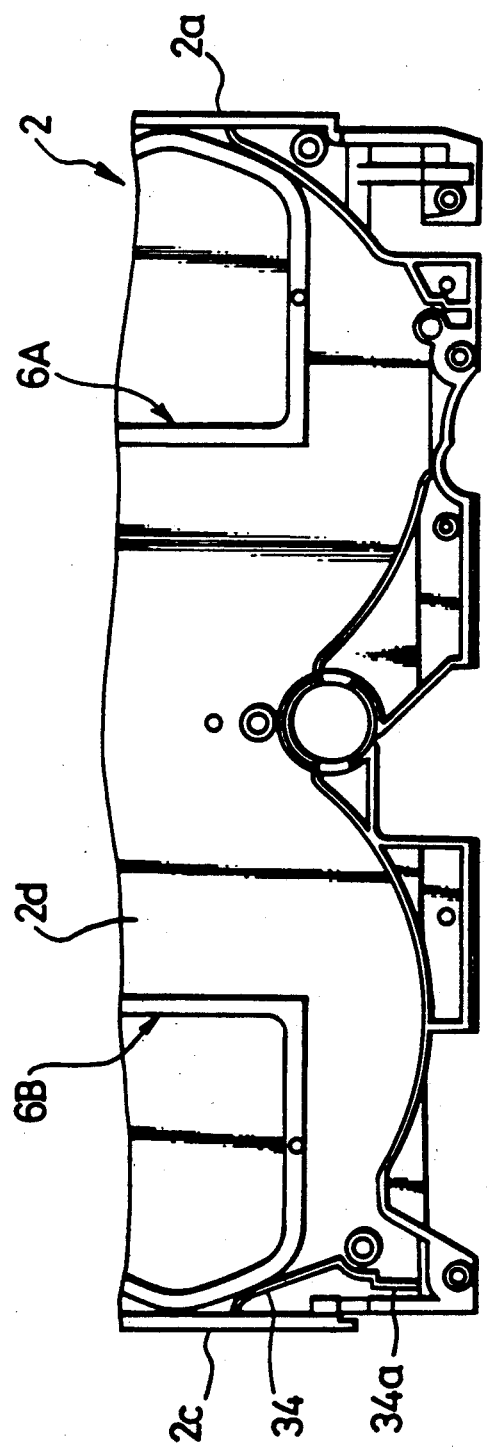
FIG. 6 is a partial, bottom view of an upper half of the tape cassette of the invention shown in FIG. 5.

In this embodiment, on the lower cassette half 3, a rib 32 is formed between the side wall 3c at the side of the supply reel 7A and the guide pole 11. An optical fiber bundle 33 is provided between a recess 32a, formed at one end of the rib 32, and the light receiving window 26 formed on the partition 25 (see FIG. 7). As shown in FIG. 6, a rib 34 is formed on the surface plate 2d of the upper cassette half 2 along the side wall 2c that the rib 34 abuts against the rib 32 and so that a concave portion 34a formed at one end of the rib 34 is located between the recess 32a of the rib 32 and the partition 25 of the lower cassette half 3. Then, the optical fiber bundle 33 is held by the recess 32a and the light receiving window 26 at the side of the lower cassette half 3, and by the concave portion 34a at the side of the upper cassette half 2 (see FIG. 8).

Referring back to FIG. 5, it will be seen that a tape pad 37 is inserted into a slit formed between protrusions 35 and 36, and the magnetic tape 44 is guided by the tape pad 37 and the guide pole 11.

Figure 7:
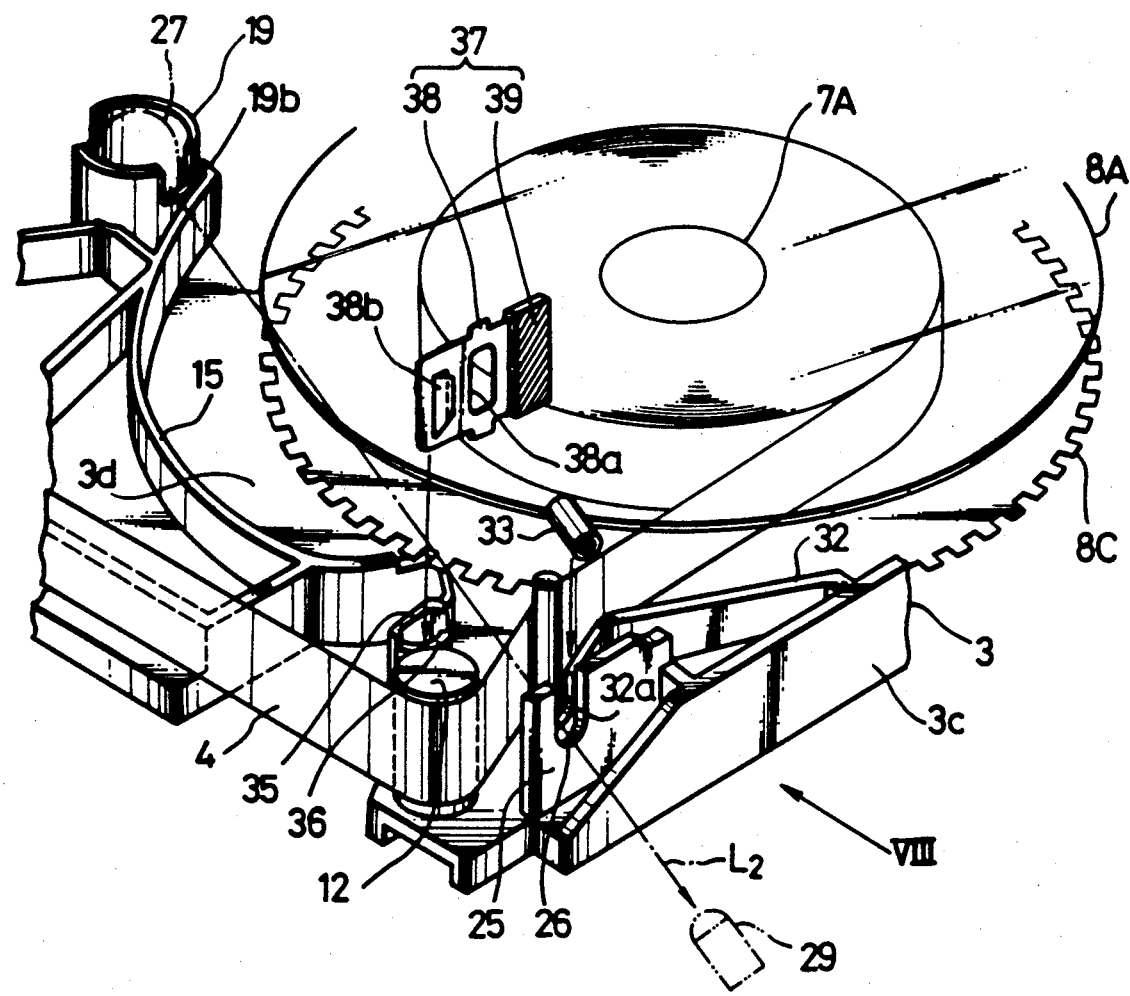
FIG. 7 is an exploded, perspective view illustrating a main portion of the lower cassette half side shown in FIG. 5.

As shown in FIG. 7, the tape pad 37 is comprised of a transparent resin sheet 38 and a rubber sheet 39 attached on the transparent resin sheet 38. A window 38a is formed through the central portion of the sheet 38 and one end of the sheet 38 is cut up to form a cut-up portion 38b. The cut-up portion 38b is inserted into the slit formed between the protrusions 35 and 36. In this case, the light path $L_2$ connecting the lighting window 19b and the light receiving window 26 travels through the window 38a of the sheet 38. In FIG. 7, reference numeral 8C denotes a lower reel flange.

Figure 9:
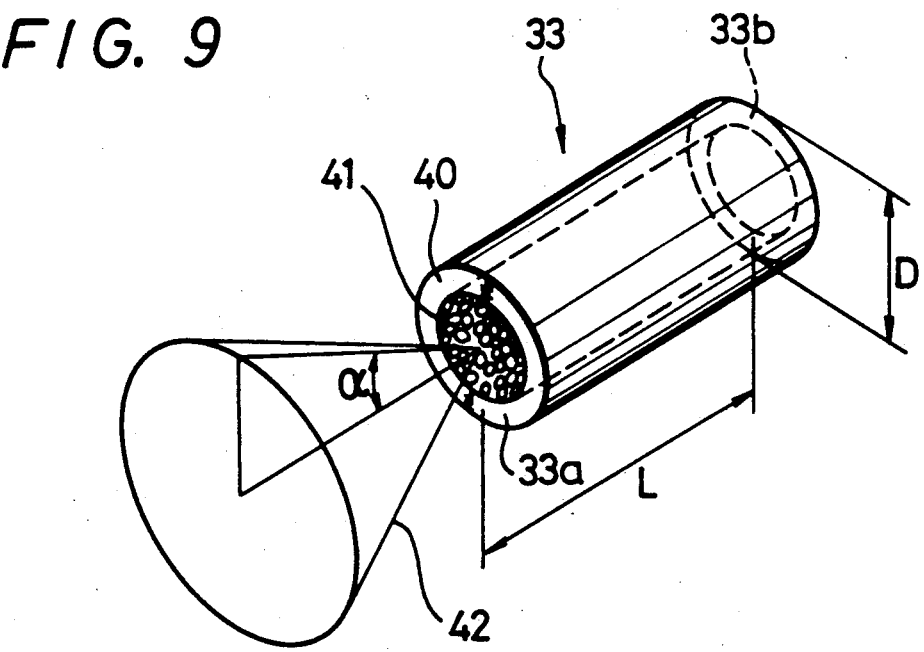
FIG. 9 is a perspective view of a bundle of optical fibers according to an embodiment of the present invention.

FIG. 9 shows an embodiment of the optical fiber bundle 33 according to the present invention. In FIG. 9, reference numeral 40 designates an outer sleeve made of a black resin. This outer sleeve 40 has a diameter D of about 3 mm and a length L of about 5 mm. A number of optical fibers 41, each having a diameter of several tens of micrometers, are bundled parallel to one another and are inserted into the outer sleeve 40. Each of the optical fibers 41 is formed such that a core made of flint glass having a refractive index of 1.62 is covered with a crown glass (cladding) having a refractive index of 1.52. The maximum value a of an incident angle of a light beam which is efficiently transmitted through the optical fiber 41 is about 34 degrees. Thus, a light beam, which has an incident angle outside an optical cone 42 having an apical angle of 2a, is attenuated within the optical fiber bundle 33 and is not transmitted.

The outer sleeve 40 of the optical fiber bundle 33 need not be made of black resin but may instead be made of a transparent resin. Also, it is possible that the optical fibers 41 can be welded by a heating-process into an optical fiber bundle having the diameter D. Furthermore, the optical fiber 41 may be a plastic fiber and also may have a larger diameter than the glass fibers previously described.

Figure 8:
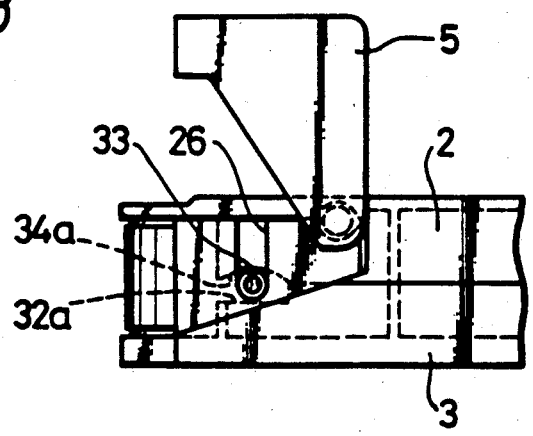
FIG. 8 is a side view of the tape cassette of FIG. 7 after it is assembled and seen from the VIII direction in FIG. 7.

In order to assemble the optical fiber bundle 33 of this embodiment into the tape cassette, as shown in FIG. 7, the optical fiber bundle 33 is temporarily engaged with the recess 32a of the rib 32 and the light receiving window 26 of the partition wall 25. The optical fiber bundle 33 may be bonded thereto by a bonding agent. Further, the width of the light receiving window 26 may be selected to be slightly smaller than the diameter D of the optical fiber bundle 33, in which case the optical fiber bundle 33 may be engaged with the light receiving window 26 by a pushing force. Thereafter, as shown in FIG. 8, when the upper cassette half 2 is coupled to the lower cassette half 3 so as to hold the guard panel 5 in place, the optical fiber bundle 33 is positively secured by the concave portion 34a of the rib 34 formed on the upper cassette half 2.

When the cassette tape of this embodiment is colored and loaded onto a video tape recorder or the like, and the light emitting element 27 is inserted into the cylindrical wall 19 with the end sensor 29 positioned outside of the light receiving window 26, we have measured how much of the light irregularly-reflected from the bottom plate 3d of the lower cassette half 3, the top plate 2d of the upper cassette half 2 or the like, and how much of the external disturbance light passed through the upper cassette half 2 or the like, are leaked through the light receiving window 26 to the end sensor 29.

The results reveal that when the colors of the upper cassette half 2 and the lower cassette half 3 are selected to be red, blue, dark gray, dark green or the like, the sample tape cassette with the optical fiber bundle 33 leaks about 40% less light through the light receiving window 26 then does a colored prior art cassette. The reason for this is that, of the light beams incident on one end 33a of the optical fiber bundle 33, any light having an incident angle larger than a (see FIG. 9) is attenuated within the optical fiber bundle 33 and is not transmitted through the other end 33b of the optical fiber bundle 33. Also contributing to the reduction in leakage is the fact that the light irregularly-reflected from the inside of the tape cassette is shielded by the partition 25 (a kind of rib holding the optical fiber bundle 33) of the lower cassette half 3, the recess 32a of the rib 32, and the rib 34 of the upper cassette half 2.

Therefore, according to the tape cassette of this embodiment, even when the tape cassette is formed as a color tape cassette, the amount of stray light leaked out from the light receiving window 26 is reduced; hence, the end sensor 29 can be prevented from malfunctioning.

Figure 10:
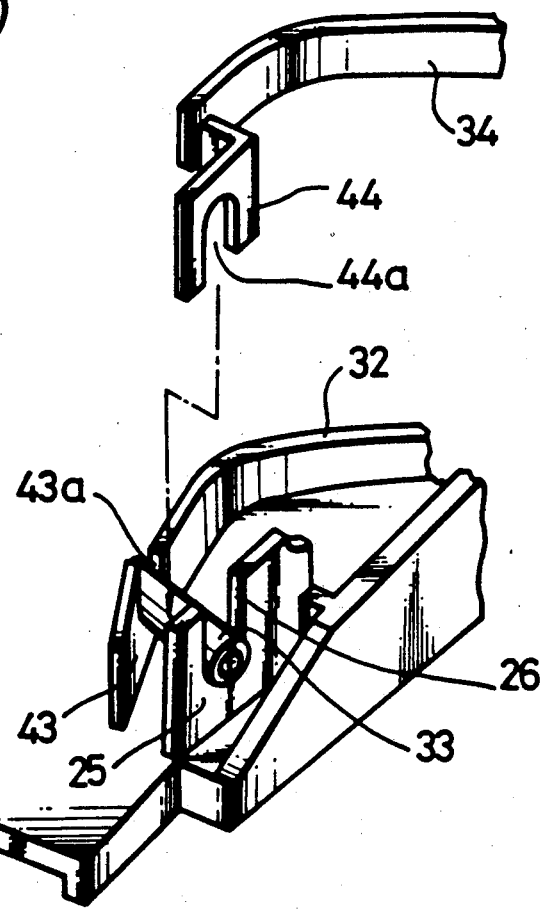
FIG. 10 is an exploded, perspective view illustrating a main portion of another embodiment of the tape cassette according to the present invention.

FIG. 10 shows another embodiment of a tape cassette according to the present invention. In FIG. 10, like parts corresponding to those of FIGS. 5 to 9 are marked with the same references and overlapping explanations will be omitted for simplicity.

In this embodiment, as shown in FIG. 10, one end 43 of the rib 32 on the lower cassette half 3 is upwardly extended to form a slit 43a. Further, one end 44 of the rib 34 on the upper cassette half 2 is downwardly extended to form a slit 44a. The optical fiber bundle 3 is temporarily engaged with the slit 43a, of the lower cassette half 3, and the light receiving window 26. Then, the upper cassette half 2 is abutted against the lower cassette half 3 so that the slit 44a of the upper cassette half 2 grips the optical fiber bundle 33. Other portions, though not shown, are formed similarly to those of the first embodiment shown in FIG. 5 and therefore will not be described herein.

According to the tape cassette of the embodiment shown in FIG. 10, the light irregularly-reflected from the inside of the tape cassette is triply shielded by the partition 25, one end 43 of the rib 32 and one end 44 of the rib 34 holding the optical fiber bundle 33, so that the amount of stray light leaked out from the light receiving window 26 is reduced more.

If the resin sheet 38 of the tape pad 37 is made of the black resin, the color of the reel flange 8A is selected to be gray-based semitransparent color, the color of each of the inside-observing windows 6A, 6B is selected to be gray-based semitransparent color, and the inner surfaces of the upper cassette half 2 and the lower cassette half 3 are roughened by a sand-blast process or the like, the amount of light leaked out from the light receiving window 26 can be reduced further.

Moreover, it is also possible that an optical fiber bundle can similarly be provided in connection with the light path $L_1$ at the side of the take-up reel 7B and so on.

According to the tape cassette of the present invention, as described above, since the ribs are respectively formed on the upper cassette half and the lower cassette half and the optical fiber bundle is provided near the light receiving window along the light path connecting the light emitting element insertion portion and the light receiving window so as to be held by these ribs, light beams having a large incident angle are attenuated within the optical fiber bundle, and also the light beams coming from various directions past the optical fiber bundle to the light receiving window are shielded by these ribs. Thus, although the tape cassette is formed as a color tape cassette wherein the upper cassette half and/or the lower cassette half are made of a material whose color is other than black so as to have a good light reflection property and so as to increase the product's attractiveness, when the above-mentioned tape cassette is loaded into a video tape recorder or the like, the amount of light leaked out from the light receiving window can be reduced thus the start sensor or the end sensor can be prevented from malfunctioning.

Further, since in the assembly-process it is sufficient that the optical fiber bundle be temporarily engaged with the slit and the light receiving window of the lower cassette half, and then the upper cassette half and the lower cassette half are abutted against each other, the assembly-process of the tape cassette of the present invention is simplified.

It should be understood that the above description is presented as an example of the preferred embodiments of the invention, and it will be apparent that many modifications and variations thereof could be effected by one with ordinary skill in the art without departing from the spirit and scope of the novel concepts of the invention; so that the scope of the invention should be determined only by the appended claims.

I claim:

1. An improved tape cassette of the type having an upper cassette half and a lower cassette half, each having side walls, and a light emitting element insertion portion located therebetween, a tape-shaped medium having a light transmissive portion wound between the upper and lower cassette halves and surrounding the light emitting element insertion portion, and a light receiving window through a side wall of one of the upper cassette half or the lower cassette half so as to oppose the light emitting element insertion portion across the tape-shaped medium, whereby when the tape cassette is loaded into a recording and reproducing apparatus, a light emitting element can be inserted into the light emitting element insertion portion and a light receiving element can be located outside of the light receiving window, to thereby establish a light path therebetween and allow detection of the predetermined portion of the tape-shaped medium, the tape cassette comprising:

(a) a rib formed on said upper cassette half;
   (b) a rib formed on said lower cassette half; and
   (c) an optical fiber bundle provided along said light path and near said light receiving window.

2. The tape cassette according to claim 1, wherein said rib formed on said lower cassette half includes a recess and said rib formed on said upper cassette half includes a concave portion so that said optical fiber bundle is held by said recess, said light receiving window and said concave portion.

3. The tape cassette according to claim 1, wherein one end of said rib formed on said lower cassette half is upwardly extended to form a slit and one end of said rib formed on said upper cassette half is downwardly extended to form a slit, whereby said optical fiber bundle is held between the slit of the lower half side and the light receiving window when said upper cassette half is abutted against said lower cassette half so as to cover the lower cassette half.

4. The tape cassette according to claim 1, wherein said optical fiber bundle is comprised of a sleeve and a number of optical fibers accommodated in said sleeve in a parallelly-bundled fashion.

5. The tape cassette according to claim 4, wherein said sleeve is made of a black resin and has predetermined diameter and length.

6. The tape cassette according to claim 4, wherein said predetermined diameter is about 3 mm and said predetermined length is about 5 mm.

7. The tape cassette according to claim 4, wherein each of said optical fibers has a predetermined diameter.

8. The tape cassette according to claim 7, wherein said predetermined diameter is several (10s) of micrometers.

9. The tape cassette according to claim 7, wherein each of said optical fibers has a core made of a predetermined material and said core is covered with a predetermined material.

10. The tape cassette according to claim 9, wherein said predetermined material of said core is a flint glass having a predetermined refractive index and said predetermined material covering said core is a crown glass having a lower predetermined refractive index.

11. The tape cassette according to claim 10, wherein said refractive index of said flint glass is 1.62 and said refractive index of said crown glass is 1.52.

12. The tape cassette according to claim 1, wherein at least one of said upper cassette half or lower cassette half is made of a material whose color is other than black.

13. The tape cassette according to claim 12, wherein said color is selected from among red, blue, dark gray and dark green.

* * * * *